United States Patent
Sasaki (12)

(10) Patent No.: US 6,670,978 B2
(45) Date of Patent: Dec. 30, 2003

(54) RECORDING METHOD AND APPARATUS IN WHICH RESPECTIVE DISTANCES BETWEEN A HEATING SPOT AND A PLURALITY OF RECORDING SPOTS ARE SUBSTANTIALLY CONSTANT

(75) Inventor: Yoshiharu Sasaki, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/758,122

(22) Filed: Jan. 12, 2001

(65) Prior Publication Data

US 2001/0015813 A1 Aug. 23, 2001

(30) Foreign Application Priority Data

Jan. 12, 2000 (JP) .................................... 2000-003665
Dec. 28, 2000 (JP) .................................... 2000-402307

(51) Int. Cl.$^7$ ............................ B41J 2/455; B41J 2/38; G03C 5/16
(52) U.S. Cl. ...................... 347/233; 347/185; 430/349; 430/350
(58) Field of Search ................................ 347/233, 234, 347/248, 185, 187, 188, 224; 430/349, 350

(56) References Cited

U.S. PATENT DOCUMENTS 4,383,261 A * 5/1983 Goldberg .................... 347/224
5,164,742 A * 11/1992 Baek et al. .................. 347/234
5,389,959 A * 2/1995 Haas .......................... 347/187
5,909,232 A * 6/1999 Goto et al. .................. 347/187

FOREIGN PATENT DOCUMENTS

| JP | 64-71771 | 3/1989 | .............. B41J/3/20 |
| JP | 8-132654 | 5/1996 | .............. B41J/2/32 |

* cited by examiner

*Primary Examiner*—Hai Pham
(74) *Attorney, Agent, or Firm*—Sughrue Mion, PLLC

(57) ABSTRACT

A recording apparatus for recording on a recording medium in a heated mode includes a first emitting portion and a second emitting portion. The first emitting portion emits writing light for providing recording spots on the recording medium. The second emitting portion emits sub-heating light for providing heating spots on the recording medium. A distance between the heating spot and the recording spot is substantially constant in a main scanning direction. The recording spots are arranged in a two-dimensional pattern including columns in the main scanning direction and rows in an auxiliary scanning direction. The recording spots aligned in the columns are inclined at a predetermined angle with respect to the main scanning direction. The same number of heating spots as the columns of the recording spots is provided in parallel to the columns and inclined at the predetermined angle with respect to the main scanning direction.

12 Claims, 12 Drawing Sheets

FIG. 3

1: WRAP IMAGE-RECEIVING SHEET AROUND DRUM

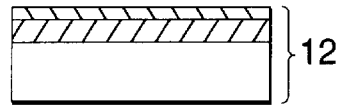

2: WRAP COLORANT SHEET

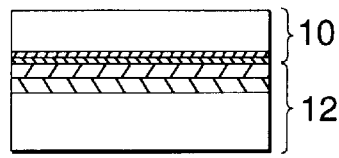

LAMINATION PROCESS

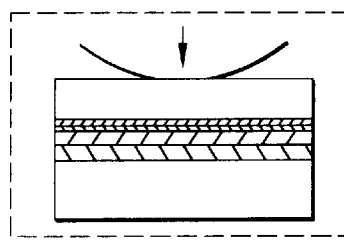

3: APPLY LASER LIGHT MODULATED WITH K DATA

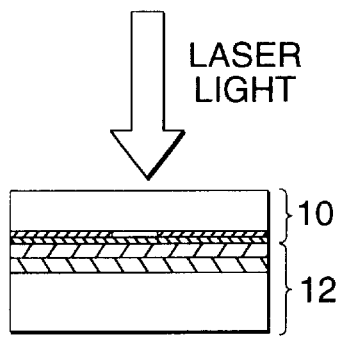

4: STRIP K COLORANT SHEET

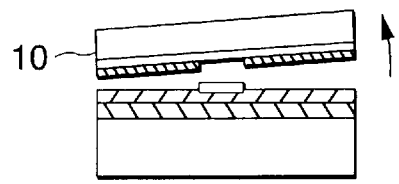

5: WRAP C COLORANT SHEET
6: APPLY LASER LIGHT MODULATED WITH C DATA
7: STRIP C COLORANT SHEET
8: WRAP M COLORANT SHEET
9: APPLY LASER LIGHT MODULATED WITH M DATA
10: STRIP M COLORANT SHEET
11: WRAP Y COLORANT SHEET
12: APPLY LASER LIGHT MODULATED WITH Y DATA
13: STRIP Y COLORANT SHEET

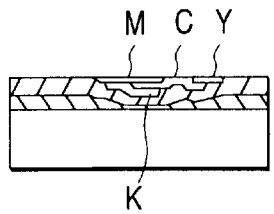

FIG. 6

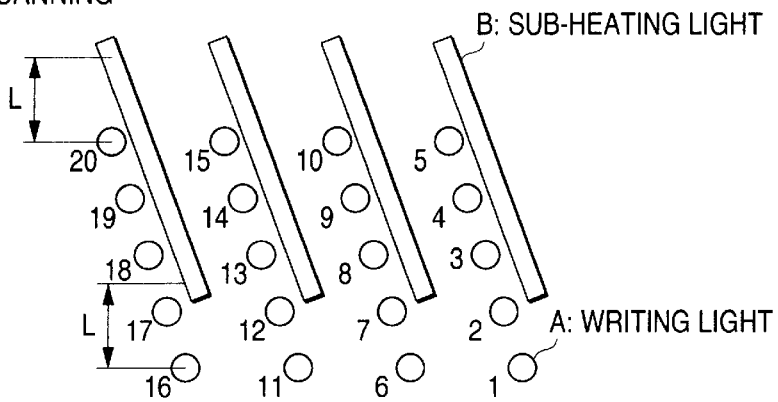

DOWNSTREAM SIDE IN A RECORDING DIRECTION OF MAIN SCANNING

B: SUB-HEATING LIGHT

DIRECTION OF MOVEMENT (ROTATION) OF RECORDING MATERIAL

A: WRITING LIGHT

UPSTREAM SIDE IN A RECORDING DIRECTION OF MAIN SCANNING

FIG. 7

DOWNSTREAM SIDE IN A RECORDING DIRECTION OF MAIN SCANNING

DIRECTION OF MOVEMENT (ROTATION) OF RECORDING MATERIAL

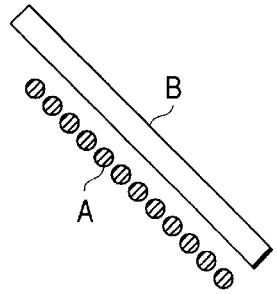

UPSTREAM SIDE IN A RECORDING DIRECTION OF MAIN SCANNING

DOWNSTREAM SIDE IN A RECORDING
DIRECTION OF MAIN SCANNING

DIRECTION OF
MOVEMENT
(ROTATION) OF
RECORDING
MATERIAL

UPSTREAM SIDE IN A RECORDING
DIRECTION OF MAIN SCANNING

RECORDING METHOD AND APPARATUS IN WHICH RESPECTIVE DISTANCES BETWEEN A HEATING SPOT AND A PLURALITY OF RECORDING SPOTS ARE SUBSTANTIALLY CONSTANT

BACKGROUND OF THE INVENTION

1. Field of the Invention

The present invention relates to an apparatus and a method for recording an image on recording media by illumination with light in a heated mode. More particularly, the invention relates to an apparatus and a method for recording an image on recording media which experiences transfer, color formation or a change in density at a specified site when the temperature of the specified site exceeds a threshold upon illumination with light.

2. Description of the Related Art

Conventionally, there is known a recording material consisting of a colorant sheet including a photothermal conversion layer, a colorant layer, etc and an image-receiving sheet including an image-receiving layer. The photothermal conversion layer is superposed on the image-receiving sheet. Applied light is converted to thermal energy in the photothermal conversion layer of the colorant sheet and the resulting thermal energy elevates the temperature of the colorant layer beyond a threshold, whereupon the colorant layer is urged against the image-receiving layer by ablation to form an image on the image-receiving layer (see JP-A-8-132654).

Since no image is formed unless the temperature of the colorant layer rises beyond a threshold, this type of recording materials has lower sensitivity to light than other conventional recording materials such as silver salt photosensitive materials. To compensate for this characteristic, an apparatus for recording an image on that type of recording materials equips a heating source in the form of a lamp such as a halogen lamp or an IR (infrared) lamp or a heater such as a Nichrome wire. There are some constitutions for such an apparatus for recording an image. A first example is a constitution that sub-heating light (i.e., the light emitted from the lamp as a heating source) and writing light (i.e., the recording light emitted from a recording light source via a half-mirror) are superposed and emitted (so-called "simultaneous heating" and see JP-A-64-71771, etc.). A second example is a constitution that the recording material is preliminarily heated by application of the heat of radiation from the heater as a heating source (so-called "preheating"). A third example is that the sub-heating light is applied after the writing light to give additional heat (so-called "post-heating").

FIGS. 15A to 15C exemplify applications of sub-heating light B for a single channel of writing light A. Preheating is possible if the sub-heating light B is applied in a position downstream to the writing light A in a recording direction of main scanning as shown in FIG. 15A. Simultaneously heating is possible if the writing light A and the sub-heating light B are applied in the same position as shown in FIG. 15B. Post-heating is possible if the sub-heating light B is applied in position upstream to the writing light A in a recording direction of main scanning as shown in FIG. 15C.

In order to get the desired effect with a limited amount of heat, the sub-heating light B is occasionally applied in a large width. In the case of preheating, the sub-heating light B extends parallel to the direction of movement of the recording material as shown in FIG. 16A or it extends perpendicular to the direction of movement of the recording material as shown in FIG. 16B. Otherwise, it may be inclined at a predetermined angle to the direction of movement of the recording material as shown in FIG. 16C.

The sub-heating light B may sometimes be applied in the presence of a one-dimensional array of writing light channels. In this case, preheating (or post-heating) can be accomplished by applying the sub-heating light B parallel to the writing light A channels that are arranged perpendicular to the direction of movement of the recording material as shown in FIG. 17A (which refers particularly to preheating). Preheating, simultaneous heating and post-heating can be accomplished by applying the sub-heating light B perpendicular to the direction of movement of the recording material in the presence of the writing light A channels that are arranged at a predetermined angle to the direction of movement of the recording material as shown in FIG. 17B. Preheating, simultaneous heating and post-heating can also be accomplished by applying the sub-heating light B at a predetermined angle to the direction of movement of the recording material in the presence of the writing light A channels that are arranged perpendicular to the direction of movement of the recording material as shown in FIG. 17C.

If the recording material is illuminated with the sub-heating light B that is applied either upstream or downstream in a recording direction of main scanning with respect to the writing light A that is to be or was applied to the recording material at a specified site, the temperature of the colorant layer at the specified site will rise beyond a threshold within a short time. Thus, the sensitivity of the recording material to the writing light A can be sufficiently increased to enable rapid recording of an image.

If recording is to be done by a plurality of writing light A channels which are positionally related to the sub-heating light B as shown in FIG. 17A, all channels of the writing light A are equally spaced from the sub-heating light B in the main scanning direction in which the recording material moves (rotates). However, the individual writing light A channels have different positional (distance) relationships if they are positionally related to the sub-heating light B as shown in FIGS. 17B and 17C.

If a plurality of writing light channels A are in a one-dimensional array, the positional relationship with the sub-heating light B shown in FIG. 17A, if not those shown in FIGS. 17B and 17C, is sufficient for each of the channels to be similarly adapted to have the same distance from the sub-heating light B. However, if one attempts to increase the recording density by narrowing the recording gap between adjacent channels of the writing light A as shown in FIG. 18, the approach illustrated in FIG. 17A cannot be taken since the channels are arranged in a two-dimensional pattern with all channels being inclined at a predetermined angle to the main scanning direction.

Hence, given the positional relationship between the writing light channels A and the sub-heating light B that is shown in FIG. 18, three heating modes, i.e., preheating, simultaneous heating and post-heating, occur in combination such that channel Nos. 1 and 5 of the writing light A are the farthest from the sub-heating light B. channel Nos. 2 and 4 of the writing light A are the second farthest, and channel No. 3 of the writing light A combines with the sub-heating light B to cause simultaneous heating. If the distance from the first to the fifth channel in the main scanning direction is short (100–200 $\mu$m), the result of recording will not be seriously affected. However, if the distance is as great as 400 $\mu$m, different recording channels have different recording characteristics and sensitivity, recording speed and even the quality of a recorded image may be deteriorated.

SUMMARY OF THE INVENTION

The present invention has been accomplished under these circumstances and has as an object providing a recording apparatus that allows the individual recording channels to maintain sufficiently uniform recording characteristics that a high-quality image can be recorded in high sensitivity and at high speed. Another object of the invention is to provide a recording method for implementing this apparatus.

The first object of the invention can be attained by a recording apparatus for recording on a recording medium in a heated mode. The recording medium being moved along a main scanning direction. The recording apparatus includes:
a first emitting portion emitting writing light for providing a plurality of recording spots on the recording medium, the recording spots being inclined at a predetermined angle with respect to the main scanning direction; and
a second emitting portion emitting sub-heating light for providing a heating spot on the recording medium,
wherein a distance between the heating spot and each of the recording spots is substantially constant in the main scanning direction.

In this recording apparatus, the heating spot from the second emitting portion is applied to the recording medium at equal distances in the main scanning direction from the recording spots applied by the first emitting portion so that the individual recording spots arranged over a wide area are subjected to sub-heating in equal duration (whether it is in a preheating, post-heating or simultaneous heating mode) to maintain uniform recording characteristics. This offers the advantage of eliminating recording spots of low sensitivity that are away from the heating spot, thereby enabling recording in high sensitivity at high speed.

Preferably, in the above recording apparatus, the first emitting portion provides rows of the recording spots being provided in an auxiliary scanning direction, and the second emitting portion provides as many heating spots as the rows of the recording spots. Further, a distance between each of the heating spots and each of the recording spots is substantially constant in the main scanning direction.

While the recording spots are arranged in a two-dimensional pattern, the heating spots are equally spaced from the columns of recording spots in the main scanning direction. In other words, as many heating spots as the columns of recording spots are arranged parallel to the latter. Therefore, if the recording medium is moved in the main scanning direction, the individual recording spots are heated under the same conditions by the heating spots and the two-dimensional array of the recording spots are heated uniformly by the minimum necessary number of heating spots.

Further preferably, in the above recording apparatus, the recording medium includes an image-receiving sheet and a colorant sheet. The image-receiving sheet is for being wound onto a recording drum of the recording apparatus. The image-receiving sheet includes an image-receiving layer. The colorant sheet is for being wound onto the image-receiving sheet so that a toner layer of the colorant sheet is superposed on the image-receiving layer of the image-receiving sheet in intimate contact with each other.

In this recording apparatus, if the colorant sheet superposed on the image-receiving sheet in intimate contact with each other is illuminated with the writing light and the sub-heating light, the energy of the applied light is converted to thermal energy in a photothermal conversion layer in the colorant sheet, causing the temperature of the areas corresponding to the recording spots to rise. Thus, the sub-heating light applied before or after the writing light contributes to increasing the temperature of the areas corresponding to the recording spots. As a result, the temperature of the areas of the toner layer corresponding to the recording spots becomes higher than a threshold and those areas are transferred to the image-receiving layer to a record image on the image-receiving sheet.

The distance between the heating spot and each of the recording spots is preferably not more than 200 $\mu$m downstream in a recording direction of main scanning in a preheating mode where the sub-heating light is applied prior to the writing light.

In this recording apparatus, the distance between the writing light and the sub-heating light in the main scanning direction in a preheating mode, or the distance between a recording spot and the heating spot, is limited not to exceed a predetermined value; hence, the loss of heat due to heat conduction is limited not to exceed a predetermined value, with the result that the heat of the sub-heating light is effectively used to contribute to heating the recording spots. The distance at which the contributory effect of heat is appreciable is not more than 200 $\mu$m, preferably not more than 100 $\mu$m.

Moreover, an emitting position of the writing light is preferably coincident with an emitting position of the sub-heating light in the main scanning direction.

In this recording apparatus, the emitting position of the writing light is coincident with the emitting position of the sub-heating light in the main scanning direction; hence, the loss of heat due to heat conduction is limited not to exceed a predetermined value, with the result that the heat of the sub-heating light is effectively used to contribute to heating the recording spots.

Further, the distance between the heating spot and each of the recording spots is preferably not more than 100 $\mu$m upstream in a recording direction of main scanning in a post-heating mode where the sub-heating light is applied after the writing light.

In this recording apparatus, the distance between the writing light and the sub-heating light in the main scanning direction in a preheating mode, or the distance between a recording spot and the heating spot, is limited not to exceed a predetermined value; hence, the loss of heat due to heat conduction is limited not to exceed a predetermined value, with the result that the heat of the sub-heating light is effectively used to contribute to heating the recording spots. The distance at which the contributory effect of heat is appreciable is not more than 100 $\mu$m, preferably not more than 50 $\mu$m.

Further preferably, a time difference between the writing light and the sub-heating light is not more than 20 $\mu$s in a preheating mode where the sub-heating light is applied prior to the writing light.

In this recording apparatus, the difference between the time when the heating spot by the sub-heating light was applied and the time when a recording spot by the writing light is applied in a preheating mode is limited not to exceed a predetermined value; hence, the loss of heat due to heat dissipation from the recording medium is limited not to exceed a predetermined value, with the result that the heat of the sub-heating light is effectively used to contribute to heating the recording spots. The time difference at which the contributory effect of heat is appreciable is not more than 20 $\mu$s, preferably not more than 10 $\mu$s.

Moreover, the time difference between the writing light and the sub-heating light is preferably not more than 10 µs in a post-heating mode where the sub-heating light is applied after the writing light.

In this recording apparatus, the difference between the time when a recording spot by the writing light is applied and the time when the heating spot by the sub-heating light was applied in a post-heating mode is limited not to exceed a predetermined value; hence, the loss of heat due to heat dissipation from the recording medium is limited not to exceed a predetermined value, with the result that the heat of the sub-heating light is effectively used to contribute to heating the recording spots. The time difference at which the contributory effect of heat is appreciable is not more than 10 µs, preferably not more than 5 µs.

The recording method according to the present invention is characterized by applying writing light and sub-heating light to a medium for recording in a heated mode using the above-mentioned recording apparatus.

This recording method uses a recording apparatus that applies the heating spot to the recording medium at equal distances from the recording spots in the main scanning direction. Since all recording spots are heated in the same state, recording of an image can be accomplished with the individual recording spots exhibiting uniform recording characteristics even if they are arranged over a wide area.

BRIEF DESCRIPTION OF THE DRAWINGS

FIG. 3 shows in conceptual form the recording steps employed by the recording apparatus of FIG. 1;

FIG. 6 illustrates how the spots of the writing light and sub-heating light emitted from the recording apparatus of FIG. 1 are arranged;

FIG. 7 illustrates a modified arrangement of the spots;

DETAILED DESCRIPTION OF THE PREFERRED EMBODIMENTS

On the pages that follow, the preferred modes for implementing the recording apparatus and method of the invention are described in detail with reference to accompanying drawings.

Figure 1:
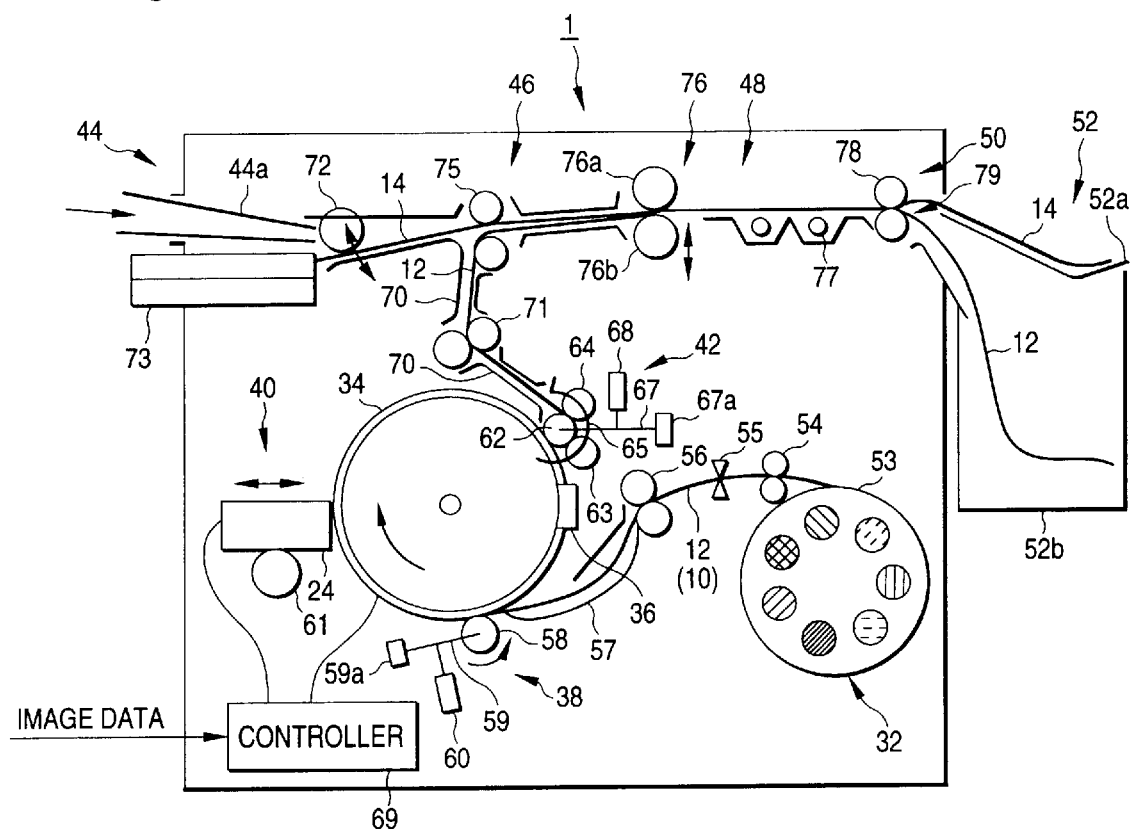
FIG. 1 shows the layout of the recording apparatus according to the invention.
Figure 2:
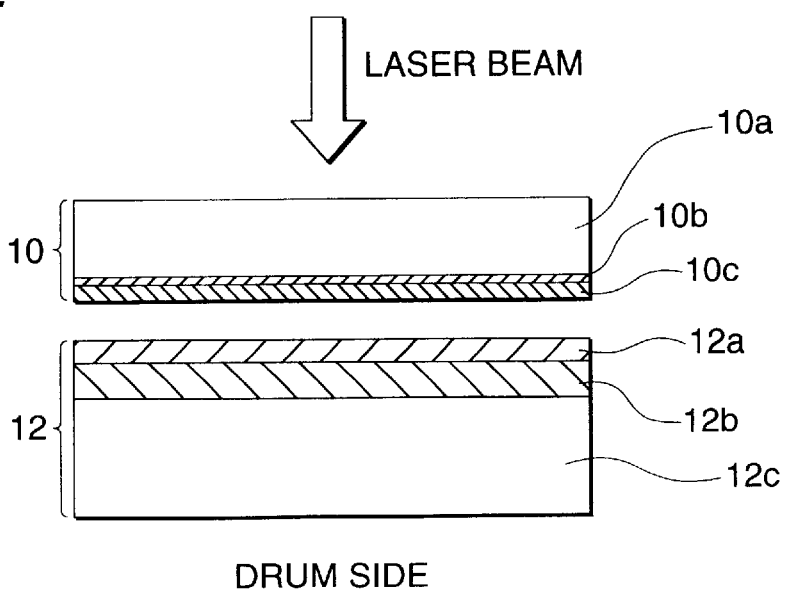
FIG. 2 is a cross-sectional view showing the arrangement of layers in the colorant sheet and the image-receiving sheet that are used in the recording apparatus of FIG. 1.
Figure 4:
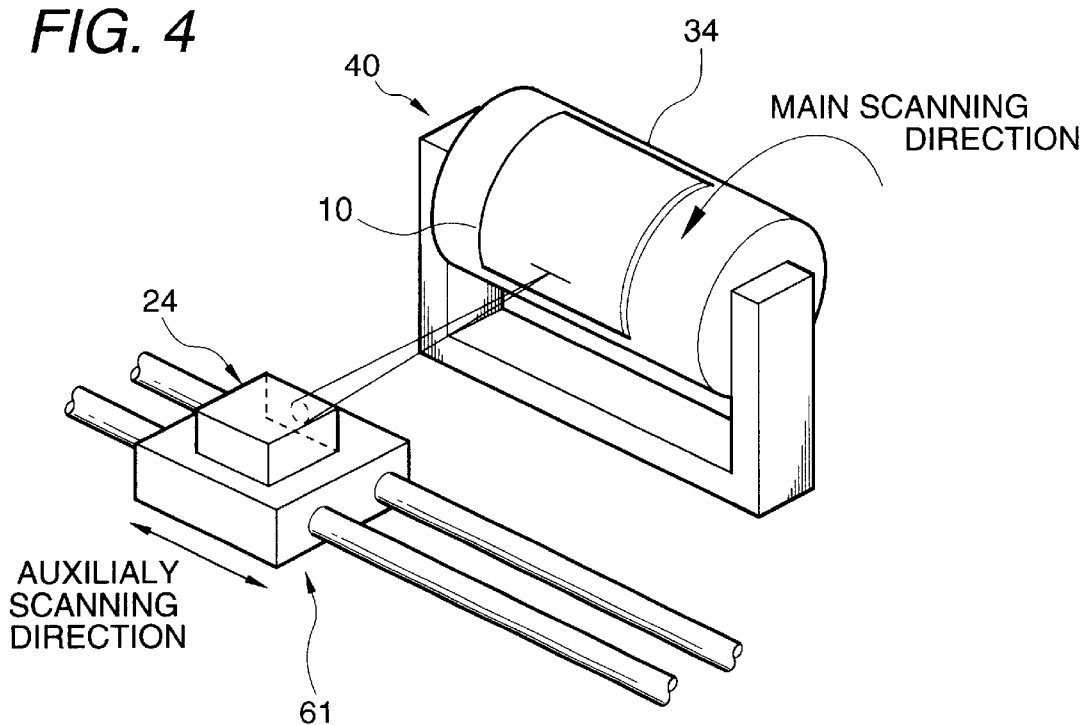
FIG. 4 schematically shows the layout of the recording head.
Figure 5:
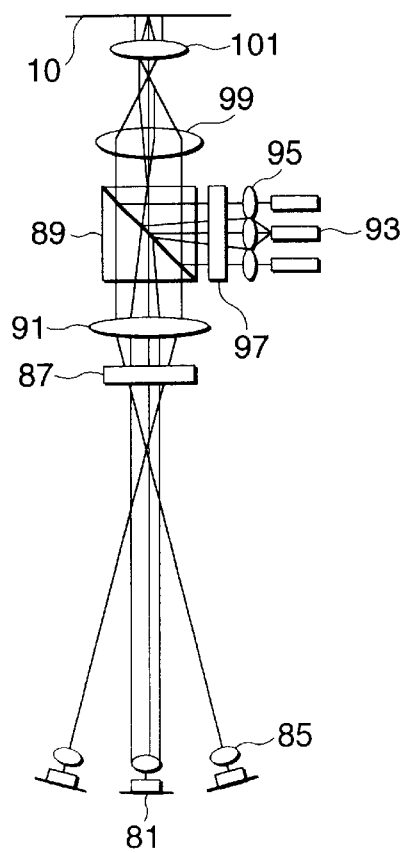
FIG. 5 schematically shows the layout of the optics in the laser head.

FIG. 1 shows the layout of the recording apparatus according the invention; FIG. 2 is a cross-sectional view showing the arrangement of layers in the colorant sheet and the image-receiving sheet that are used in the recording apparatus of FIG. 1; FIG. 3 conceptually shows the recording steps employed by the recording apparatus of FIG. 1 in form; FIG. 4 schematically shows the layout of the recording head; and FIG. 5 schematically shows the layout of the optics in the laser head.

The recording apparatus generally indicated by 1 is an apparatus for forming full color images and it includes a recording medium supply section 32, a rotating recording drum 34 for forming images, a recording medium fix/release mechanism 36 provided on the drum 34, a laminating mechanism 38 provided partly along the outer circumference of the drum 34, a recording head 40, a strip mechanism 42, a paper feed section 44, a laminating section 46, a fixing section 48, a stripping section 50, a tray section 52, a controller 69 and a motor (not shown) for driving the drum 34.

The operation of the recording apparatus 1 is outlined below. First, the recording medium supply section 32 supplies two recording media, an image-receiving sheet 12 and a colorant (toner) sheet 10, onto the rotating recording drum 34. The image-receiving sheet 12 is then fixed on the drum 34 by means of the recording medium fix/release mechanism 36. The colorant sheet 10 is pressed onto the image-receiving sheet 12 under heating by means of the laminating mechanism 38 so that the colorant sheet 10 is adhesively superposed on the image-receiving sheet 12. The colorant sheet 10 and the image-receiving sheet 12 may be advantageously made of materials capable of thermal transfer with a laser.

Subsequently, the recording head 40 controlled by the controller 69 in accordance with image signals performs imagewise exposure in a heated mode with laser beams being directed toward the colorant sheet 10, whereupon a latent image is recorded on the colorant sheet 10.

As shown in FIG. 2, the toner sheet 10 consists of a base 10a coated with a photothermal conversion layer 10b and a toner layer 10c on the side which faces the image-receiving sheet. The image-receiving sheet 12 consists of a base 12c coated with a cushion layer 12b and an image-receiving layer 12a on the side which faces the toner sheet.

The base 10a is made of a material that transmits laser beam, as exemplified by PET (polyethylene terephthalate)-based, TAC(triacetyl cellulose)-based or PEN(polyethylene naphthalene)-based material. The photothermal conversion layer 10b may be made of carbon, a black substance, an IR absorbing dye, a substance capable of absorbing specific wavelength, or any other substances that are capable of efficient conversion of laser energy to heat. The toner layer 10c is typically for K, C, M and Y colors and it may be for special colors such as gold, silver, brown and gray. In a recording mode, the toner layer 10c is brought into intimate contact with the image-receiving layer 12a in the image-receiving sheet 12 and, upon illumination with laser beams from the recording head 40, it is heated to have the toner image transferred to the image-receiving layer 12a in the image-receiving sheet 12.

The base 12c may be the same as the base 10a of the colorant sheet 10 or it may be a light-opaque base. In a recording mode, the image-receiving layer 12a is brought into intimate contact with the toner layer 10c in the colorant sheet 10 and the heated areas of the toner layer 10c are transferred to the image-receiving layer 12. When transfer is made from a plurality of toner sheets 10 in superposition, the cushion layer 12b effectively absorbs the difference in toner size. The light-opaque base mentioned above is typically white, black, silver white or any other color that has a light transmittance of no more than 50%.

Then, the colorant sheet 10 is stripped from the image-receiving sheet 12 on the drum 34 by means of the strip mechanism 42 so that the latent image recorded on the colorant sheet 10 is transferred to the image-receiving sheet 12. Upon development, an image is formed on the image-receiving sheet 12. These steps are repeated for other three or four colors.

Thus, a color image is formed on the image-receiving sheet 12, which then enters the laminating section 46 where it is laminated with a final receiving sheet 14 being supplied from the paper feed section 44. The assembly then enters the fixing section 48, where the image-receiving layer of the image-receiving sheet 12 is photo cured. Thereafter, the image-receiving sheet 12 is stripped from the final receiving sheet 14 in the stripping section 50. The final receiving sheet 14 bearing the full color image is ejected onto a proof tray 52a and the spent image-receiving sheet 12 is ejected into a waste tray 52b. The full color image is thus obtained as a hard copy.

In a certain case, the laminating section 46 may be designed as a separate entity from the recording apparatus 1.

FIG. 3 shows the steps in a process of forming a full-color image consisting of K, C, M and Y colors on the image-receiving sheet 12 and laminating the full-color image onto the final receiving sheet 14. The steps are as follows:

1) The image-receiving sheet 12 is wrapped onto the outer circumference of the recording drum 34.
2) A K toner sheet 10 is wrapped onto the image-receiving sheet 12, optionally followed by lamination.
3) Writing light is applied in accordance with the data for a K image and characters so that a record in K color is formed on the image-receiving sheet 12.
4) The K toner sheet 10 is stripped from the image-receiving sheet 12.
5) A C colorant sheet is wrapped onto the image-receiving sheet 12, optionally followed by lamination.
6) Writing light is applied in accordance with the data for a C image and characters so that a record in C color is formed on the image-receiving sheet 12.
7) The C colorant sheet is stripped from the image-receiving sheet 12.
8) A M colorant sheet is wrapped onto the image-receiving sheet 12, optionally followed by lamination.
9) Writing light is applied in accordance with the data for an M image and characters so that a record in M color is formed on the image-receiving sheet 12.
10) The M colorant sheet is stripped from the image-receiving sheet 12.
11) A Y colorant sheet is wrapped onto the image-receiving sheet 12, optionally followed by lamination.
12) Writing light is applied in accordance with the data for a Y image and characters so that a record in Y color is formed on the image-receiving sheet 12.
13) The Y colorant sheet is stripped from the image-receiving sheet 12.
14) As the result of steps 1)-13), K, C, M and Y colors are formed, superposed in some areas but not superposed in other areas, to produce the desired color image.
15) The color image is then transferred to the final receiving sheet 14.

The individual sections of the recording apparatus 1 are now described in detail.

The recording medium supply section 32 includes a recording medium station 53, a pair of draw-out rollers 54, a cutter 55, a pair of rollers 56 and a guide 57. The recording medium station 53 holds rolls of recording media such as a roll of image-receiving sheet 12 and rolls of colorant sheets 10 such as standard K, C, M and Y toner sheets and sheets of special colors commonly used in the printing industry. The pair of draw-out rollers 54 is provided to draw out one recording medium. The cutter 55 cuts the recording medium drawn out of the station 53 by a predetermined length by means of the rollers 54 in order to cut the recording medium into a sheet. The pair of rollers 56 holds and transports the sheet of recording medium. The guide 57 guides the sheet of recording medium onto the drum 34 such that the front end of the recording medium is guided to the fixing position in the recording medium fix/release mechanism 36 mounted on the drum 34.

The image-receiving sheet 12 is the first recording medium that is supplied to the image forming drum 34. The front end of the image-receiving sheet 12 is clamped or otherwise fixed to the recording medium fix/release mechanism 36. As the drum 34 rotates in the direction indicated by the arrow, the image-receiving sheet 12 is wound up along the outer circumference of the drum 34 and its rear end is also fixed by the mechanism 36. Preferably, either the area of the mechanism 36 which fixes the front end of the image-receiving sheet 12 or the area which fixes its rear end or both areas are adapted to be slidable along the outer circumference of the drum 34 so that sheets of recording medium in varying length can be fixed onto the drum 34.

Subsequently, the colorant sheet 10 being transported from the recording medium supply section 32 is wound onto the image-receiving sheet 12 in entirely the same manner as the image-receiving sheet 12 was wound onto the drum 34. The colorant sheet 10 can be superposed on the image-receiving sheet 12 by means of the laminating mechanism 38 which consists of a laminating roller 58 having a built-in heater (not shown), an arm 59 that allows the laminating roller 58 to pivot about a fulcrum 59a so that it contacts or departs from the outer circumference of the drum 34, and an urging member 60 that urges the laminating roller 58 onto the outer circumference of the drum 34 under a predetermined pressure.

The urging member 60 may be a spring, an air cylinder's manipulator and the like. Since the image-receiving layer on the outermost surface of the image-receiving sheet 12 is sticky, it can be laminated with the colorant sheet 10 which is wrapped onto it under the predetermined pressure being exerted by the laminating roller 58. This does not only eliminate the development of wrinkles and any other surface detects in the colorant sheet 10 but also permits the image-receiving layer of the image-receiving sheet 12 to be bonded to the colorant layer of the colorant sheet 10 under a uniform adhesive force.

In the above case, the colorant sheet 10 is laminated to the image-receiving sheet 12 by means of the laminating roller 58 which is urged at a sufficient pressure to achieve uniform and strong bonding. Preferably, the laminating roller 58 is not only urged but also heated in order to provide a greater adhesive force.

In the illustrated case, the laminating roller 58 is used to press the colorant sheet 10 into superposition on the image-receiving sheet 12. Any other means that is capable of pressing the colorant sheet 10 into superposition on the image-receiving sheet 12 may be substituted, as exemplified by a rod-shaped pressing member having a smooth end.

When the image-receiving sheet 12 is wound onto the rotating recording drum 34, it is preferred that the front end of the sheet is fixed by the recording medium fix/release mechanism 36 while the other portions of the sheet are held by the transport rollers 56 or the laminating roller 58 or any other suitable means so that the sheet 12 is wrapped around the outer circumference of the drum 34 under a tension. If desired, the outer circumference of the drum 34 may be perforated so that the sheet 12 can be sucked to be fixed in position by a suctioning mechanism such as a vacuum aspirator. The suctioning mechanism and the recording medium fix/release mechanism 36 are preferably used in combination but only one of them may be used. In either way, the image-receiving sheet 12 can be fixed to the outer circumference of the recording drum 34 without developing wrinkles or any other surface defects and without causing positional offsets.

The colorant sheet 10 is preferably placed under tension when it is superposed on the image-receiving sheet 12. As in the case of wrapping the image-receiving sheet 12 onto the recording drum 34, the front end and/or rear end of the colorant sheet 10 may be fixed by the recording medium fix/release mechanism 36 which is optionally used in combination with the above-mentioned suctioning mechanism. The tension to be applied to the colorant sheet 10 during lamination is preferably set at a smaller value than the tension that is applied to the image-receiving sheet 12 when it is wound onto the recording drum 34.

As shown in FIG. 4, the two main components of the recording head 40 includes a laser head 24 and an auxiliary scanner 61. The laser head 24 includes, for example, a laser light source, including a modulator, for emitting light of high-density energy such as laser beams and an imaging lens for adjusting the diameter of laser beam spots. The auxiliary scanner 61 performs auxiliary scanning by moving the laser head 24 in a direction parallel to the axis of the recording drum 34. As the recording drum 34 rotates, the colorant sheet 10 undergoes main scanning with laser light.

Instead of providing the recording head 40 with the auxiliary scanner 61, the recording drum 34 maybe equipped with an axially transporter so that it is rotated for main scanning and moved axially for auxiliary scanning. Details of the recording head 40 in the recording apparatus according to the invention will be given later. Suffice it here to say that this recording head is of a multi-spot configuration that is capable of emitting a plurality of laser beams and which is composed of a two-dimensional array of laser diode (LD) devices serving as recording elements.

Any laser light sources may be used as long as they can emit light of high-density energy capable of exposure in a heated mode and they include gas lasers such as an argon ion laser, a helium neon laser and a helium cadmium laser, solid lasers such as a YAG laser, semiconductor lasers, as well as dye lasers and excimer lasers. The laser light to be used for image recording in the present invention may be the emission which is either direct from these lasers or passed through a second harmonic generating device to be halved in wavelength.

A suitable laser is chosen from the above list in accordance with the wavelength at which the colorant sheet 10 is sensitive to laser light, its sensitivity and the required recording speed. Semiconductor lasers are the most preferred from the viewpoints of cost, power, size, ease of modulation and so forth. Modulation of laser light in accordance with image signals can be performed by any known techniques. In the case of an argon ion laser, the laser beams maybe passed through an external modulator. In the case of a semiconductor laser, the current to be injected into the laser may be controlled (directly modulated) by the image signals. The size of the laser beam spots to be focused on the photothermal conversion layer and the scan speed are set in accordance with the required image resolution, the sensitivity of the recording material, and so forth. For printing applications, high resolution is generally required and the beam spots are preferably small from the viewpoint of image quality. On the other hand, the latitude in depth of focus decreases to such an extent that it cannot be easily controlled by mechanical means.

If the scan speed is unduly small, heat loss from the conduction of heat to the base of the colorant sheet 10 and the like increases. This does not only lower the energy efficiency but also prolongs the recording time. Considering these factors, the beam spot diameter on the photothermal conversion layer should range from 5 to 50 $\mu$m, preferably from 6 to 30 $\mu$m, and the scan speed is at least 1 m/sec, preferably at least 3 m/sec.

The image signals are supplied from an image reader which is external to the recording apparatus 1 of the invention or from a workstation (W/S) having DTP capabilities, an electronic publishing system or various kinds of storage media (e.g. magnetic tape, floppy disk, hard disk and RAM card). The supplied image signals have the color space and other variables matched by a color management system (color image reproducing system) or the like and thence transmitted to the controller 69 as digital signals via SCSI (small computer system interface); after receiving the necessary processing schemes in the controller 69, the digital image signals are transmitted to the recording head 40 to control the exposure with the laser head 24 in a heated mode.

The controller 69 controls not only the auxiliary scan by the auxiliary scanner 61 in the recording head 40 but also the main scan accompanying the rotation of the recording drum 34. At the same time, the controller 69 controls the various parts of the recording apparatus 1, as well as its overall sequence.

The strip mechanism 42 has two functions. First, the colorant sheet 10 having a latent image formed on it as the result of exposure with the recording head 40 in a heated mode is stripped from the image-receiving sheet 12. Second, at the same time, the latent image on the colorant sheet 10 is stripped and transferred to the image-receiving sheet 12 for subsequent development. To perform these functions, the strip mechanism 42 has a strip roller 62, two segmented rollers 63 and 64 in contact with the strip roller 62, a comb-shaped guide plate 65 provided between the segmented rollers 63 and 64 to extend along the strip roller 62, and a bracket (not shown) on which these components are mounted altogether.

The strip roller 62 is axially supported by an arm 67 so that it pivots about a fulcrum 67a to either approach or depart from the recording drum 34. It is also equipped with an urging member 68 by which the strip roller 62 presses the laminated element of the image-receiving sheet 12 and the colorant sheet 10 on the drum 34 via the arm 67.

By exposure in a heated mode, thermal energy is applied to the colorant sheet 10 imagewise to lower the adhesion of the colorant layer, whereupon a latent image is formed on the colorant sheet 10. When the arm 67 pivots about the fulcrum 67a such that the bracket approaches the laminated element of the colorant sheet 10 and the image-receiving sheet 12 having the image-receiving layer to which the colorant sheet 10 is bonded, the comb-shaped guide plate 65 is inserted into the laminated element between the image-receiving layer of the image-receiving sheet 12 and the colorant layer of the colorant sheet 10 and at the same time the colorant sheet side of the laminated element is depressed by the strip roller 62.

If the joining ends of the colorant sheet 10 and the image-receiving sheet 12 are offset, the comb-shaped guide plate 65 can be easily inserted between the two sheets. Subsequently, the recording drum 34, as well as the strip roller 62 and segmented rollers 63 and 64 are rotated so that the front end of the colorant sheet 10 is moved along the comb-shaped guide plate 65 to be nipped between the strip roller 62 and the segmented roller 63.

Then, the colorant sheet being urged by the strip roller 62 is held and transported between the stripper roller 62 and each of the segmented rollers 63 and 64 and stripped from the image-receiving sheet 12. Since the area of the colorant sheet 10 being urged by the strip roller 62 can be stripped at a constant speed, the force by which it is stripped can be held constant and no vibratory phenomena such as stick/slip will occur, eliminating the possibility of uneven stripping.

Since the force that is exerted on the image-receiving sheet 12 to strip the colorant sheet 10 will not vary during the stripping process, there is no possibility for an offset to occur in the position where the image-receiving sheet 12 is fixed on the recording drum 34. This eliminates the chance of a drop in positional precision and produces a monochromatic halftone image having high quality, resolution and contrast but which has not suffered any unwanted defects such as uneven stripping and positional offsets.

The same procedure is repeated for C, M, Y and K colors to produce images of these four colors which are brought into exact registry, stripped, transferred and developed. The image-receiving sheet 12 bearing these images is guided by two guide members 70 and transported by a transport rollers 71 to enter the laminating section 46. In synchronism with the transport of the image-receiving sheet 12, a final receiving sheet supply roll 72 delivers a final receiving sheet 14 from a cassette 73 into the laminating section 46, in which the final receiving sheet 14 is guided by the guide member 70 and further transported to the right in FIG. 1. If desired, the final receiving sheet 14 may be fed to the supply roll 72 via a hand feed port 44a. Subsequently, the image-receiving sheet 12 and the final receiving sheet 14 are passed between a pair of register rollers 75 so that they are brought into superposition and thence transported into the fixing section 48.

In the fixing section 48, the assembly of the image-receiving sheet 12 and the final receiving sheet 14 is held and transported between a compressing roller 76a and a heating roller 76b so that the image is fixed under heating. The assembly then passes over post-exposure lamps 77 such as UV lamps so that the image-receiving layer of the image-receiving sheet 12 cures to become readily strippable.

In the stripping section 50, the image-receiving layer that has cured to become readily strippable is stripped from the other part of the image-receiving sheet 12 by means of strip rollers 78 and a strip guide 79 and then pasted to the final receiving sheet 14 so that the image is transferred thereto. The final receiving sheet 14 bearing the transferred image is ejected as a hard copy onto the proof tray 52a in the tray section 52 whereas the image-receiving sheet 12 having no image-receiving layer is dumped into the waste tray 52b.

To record an image, the recording head 40 turns on and off the modulation of the emitted laser beams in accordance with the recording data and it moves in the auxiliary scanning direction to heat the colorant sheet 10 on the rotating recording drum 34.

As shown in FIG. 5, the laser head 24 is furnished with a semiconductor laser 81 which emits writing light. The laser light emitted from semiconductor lasers usually does not have a constant angle of divergence about the optical axis. Stated more specifically, the angle of divergence along a direction perpendicular to the pn junction plane is large (say, 30–40°) whereas the angle of divergence along a direction parallel to the pn junction plane is small (say, about 10°).

A typical example of the semiconductor laser 81 is a single-mode semiconductor laser that has a single light-emitting plane (or point) and which emits laser light having a wavelength of 830 nm, a power of 140 mW and a half-power width of 0.4 nm. The stated wavelength is the value at which the photothermal conversion layer 10b in the colorant sheet 10 used in the embodiment provides a maximum efficiency in photothermal conversion. By ensuring that the laser light emitted from the semiconductor laser 81 has this value of wavelength, the power of the emitted laser light (writing light) can be effectively used in image recording.

To be compatible with the density at which dots are recorded on the colorant sheet 10, the spot of the writing light on the colorant sheet 10 has to be made correspondingly small in diameter (say, 10 $\mu$m and less). In the embodiment under consideration, the semiconductor laser 81 which emits recording light is of a single-mode type. A single-mode semiconductor laser is characterized by the very high cost per watt of the power of emitted laser light (i.e., the price of the laser increases very markedly with the power of emitted laser light). In the embodiment under consideration, the cost of the recording apparatus 1 is made reasonable by using a semiconductor laser of the relatively low power (140 W).

The semiconductor laser 81 is not limited to a single-mode type and a multi-mode semiconductor layer may be substituted. Small spots of laser light can be formed by providing a limited aperture in the optics.

The wavelength of the writing light is not limited to 830 nm and any other values may be selected as long as they are compatible with the spectral sensitivity of the recording material used. The power of the writing light varies with the sensitivity of the recording material and the time required by the recording apparatus to record an image but it may be within practical ranges. It is also possible to apply a semiconductor laser of a linear-array type which is furnished with more than one light-emitting plane (or point). The semiconductor laser 81 may include a plurality of semiconductor lasers. Besides a semiconductor laser, solid lasers such as YAG and YFL or gas lasers such as an Ar laser and a $CO_2$ laser may also be used.

A first group of first lenses 85 is provided on the side of the semiconductor laser 81 from which it emits laser light. The first group of first lenses 85 is away from the light-emitting plane of the semiconductor laser 81 by a distance equal to its focal length. The writing light emitted from the semiconductor laser 81 to be incident on the first lenses 85 passes through it to be collimated (divergent light is converted to parallel light).

A first polarizer plate 87 is provided on the side of the first lenses 85 from which the laser light is emitted. The first polarizer plate 87 causes the polarization of the light from the semiconductor laser 81 to rotate in a predetermined direction and adjusts it to be oriented for transmissive polarization so that a polarized beam splitter 89 to be described below allows for maximum transmittance of the writing light. A second lens 91 is provided between the first polarizer plate 87 and the polarized beam splitter 89 to have the light from the semiconductor laser 81 condensed in a predetermined position.

While these are the optical elements provided on the optical path of the laser light emitted from the semiconductor laser 81 to reach the polarized beam splitter 89, other elements are provided on an axis that crosses said optical axis at right angles on the polarized beam splitter 89 and they consist, in order approaching the polarized beam splitter 89, of a semiconductor laser 93 emitting the sub-heating light, a second group of first lenses 95 similar to the first lenses 85, and a second polarizer plate 97. The second group of first lenses 95 causes the divergent light from the semiconductor lens 93 to be condensed in a predetermined position. The second polarizer plate 97 causes the polarization of the light from the semiconductor laser 93 to rotate in a predetermined direction and adjusts it to be oriented for reflective polarization so that the polarized beam splitter 89 allows for maximum transmittance of the sub-heating light. The polarized beam splitter 89 combines the light from the semiconductor laser 81 with the light from the semiconductor laser 93.

On the side of the polarized beam splitter 89 from which the laser lights emitted, a third lens 99 and a fourth lens 101 are provided in such an order that the third lens 99 is the closer to the polarized beam splitter 89. The third lens 99 causes the combined writing and sub-heating light to be condensed in a predetermined position and the fourth lens 101 condenses it on the colorant sheet 10 on the rotating recording drum 34.

The writing light emitted from the first polarizer plate 87 has been polarized in a direction of about zero degrees. The polarized beam splitter 89 is oriented at zero degrees to the optical axis of the writing light from the first polarizer plate 87 and the direction of polarization of the writing light has been finely adjusted by the first polarizer plate 87 such that the polarized beam splitter 89 will have a maximum transmittance of the writing light. For these two reasons, almost all (say, 95% or more) of the writing light polarized in a direction of about zero degrees passes through the polarized beam splitter 89 to be emitted toward the third lens 99.

It should be noted that the semiconductor laser 81, first polarizer plate 87, second lens 91, polarized beam splitter 89, third lens 99 and fourth lens 101 correspond to the first emitting portion of the present invention. On the other hand, the semiconductor laser 93, the second group of the first lenses 95, polarized beam splitter 89, third lens 99 and fourth lens 101 correspond to the second emitting portion of the invention.

At typical example of the semiconductor laser 93 is a multi-mode semiconductor laser that has a single light-emitting plane (or point) and which emits laser light having a wavelength of 830 nm (at which the photothermal conversion layer 10b in the colorant sheet 10 provides a maximum efficiency in photothermal conversion) and a power of 1 W. By ensuring that the wavelength of the laser light emitted from the semiconductor laser 93 agrees with value of wavelength at which the photothermal conversion layer 10b provides a maximum efficiency in photothermal conversion, the power of the emitted laser light can be effectively used in image recording.

The spot of the sub-heating light on the colorant sheet 10 need not be reduced in diameter and can safely be made larger than the density at which dots are recorded on the colorant sheet 10. Hence, a multi-mode semiconductor laser is used as the semiconductor laser 93 for emitting the sub-heating light. Multi-mode semiconductor lasers are characterized by the low cost per watt of the power of emitted laser light (i.e., the price of the laser does not increase very markedly with the power of emitted laser light); therefore, the cost of the recording apparatus 1 can be substantially reduced as compared with the case of using a single-mode semiconductor laser having a comparable power.

As in the case of the semiconductor laser 81, it is possible to apply a semiconductor laser 93 of a linear-array type which is furnished with more than one light-emitting plane (or point). The semiconductor laser 93 may consist of plural sets of semiconductor lasers. Besides a semiconductor laser, solid lasers such as YAG and YFL or gas lasers such as an Ar laser and a $CO_2$ laser may also be used.

The laser light emitted from the semiconductor laser 93 is collimated by the first lenses 95 and launched into the second polarizer plate 97, where the direction of its polarization is rotated before entrance into the polarized beam splitter 89. Almost all (say, 95% or more) of the sub-heating light launched into the polarized beam splitter 89 is reflected by its reflecting surface and combined with the writing light from the semiconductor laser 81 that has passed through the polarized beam splitter 89. The combined sub-heating and writing light is emitted toward the third lens 99.

The combined sub-heating and writing light passes through the third lens 99 and the fourth lens 101 to emerge from the housing of the laser head 24 via an aperture (not shown) The colorant sheet 10 retained on the circumference of the rotating drum 34 is provided in the position corresponding to the focal point of the fourth lens 101 so that it is illuminated with the combined writing and sub-heating light that emitted from the fourth lens 101 to go outside the housing of the laser head 24.

FIG. 6 illustrates how the spots of the writing light and sub-heating light emitted from the recording apparatus of FIG. 1 are arranged, and FIG. 7 illustrates a modified arrangement of the spots.

The writing light A from the laser head 24 provides recording spots arranged as shown in FIG. 6. To be more specific, the spots are arranged in four columns in the main scanning direction and five rows in the auxiliary scanning direction, totaling 20 spots in number. Therefore, the recording spots are arranged in a two-dimensional pattern consisting of columns extending in the main scanning direction and rows in a direction perpendicular to the main scanning direction. Note that the recording spots in the column direction are one-dimensionally aligned at a predetermined angle with respect to the main scanning direction.

The sub-heating light B from the laser head 24 provides heating spots typically arranged as shown in FIG. 6. To be more specific, lines of heating spots as many as the recording spots (in four columns in the illustrated case) are inclined at the same angle as the columns of the recording spots so that they are arranged parallel to the latter. The starting and terminating ends of each heating spot are spaced from the first recording spot (say, spot 11) in the adjacent column and the last recording spot (say, spot 15) by equal distances L in the main scanning direction. In other words, the heating spots are each applied to the colorant sheet 10 at equal distances L from the individual recording spots in the main scanning direction.

Since the heating spots emitted by the second emitting portion are applied to the colorant sheet 10 at equal distances from the recording spots in the main scanning direction, the individual recording spots arranged over a wide area are subjected to sub-heating (in a preheating, post-heating or simultaneous heating mode) within short times to maintain uniform recording characteristics.

Therefore, if the colorant sheet 10 superposed on the image-receiving sheet 12 in intimate contact with each other is illuminated with the writing light A and the sub-heating light B, the energy of the applied light is converted to thermal energy in the photothermal conversion layer 10b in the colorant sheet 10 and the temperature of the areas corresponding to the recording spots rises. In this case, the sub-beating light applied before, simultaneously with or after the writing light A contributes to increasing the temperature of the areas corresponding to the recording spots and the degree of contribution is uniform for all recording spots. As a result, the areas of the colorant sheet 10 corresponding to the recording spots become hotter than a threshold temperature and are transferred onto the image-receiving sheet 12 to record a uniform image on the latter. In addition, the recording spots of low sensitivity that are away from the heating spot are eliminated to enable recording in high sensitivity and at high speed.

As a further advantage, the heating spots are arranged parallel to the recording spots in the column direction of a two-dimensional array and, hence, all recording spots in the two-dimensional array are uniformly heated by the minimum necessary number of heating spots. In the embodiment described above, the recording spots and the heating spots are arranged in a 5×4 array but other formats of two-dimensional array may be adopted. If desired, a single heating spot may be placed parallel to an inclined one-dimensional array of recording spots as shown in FIG. 7 and this provides the same effect as the above-described 5×4 two-dimensional array.

EXAMPLES

Image recording was performed with the distance between the writing light A and the sub-heating light B being adjusted to various values and the state of the records was evaluated to determine an optimum distance between the writing light A and the sub-heating light B, as will be described below with reference to FIGS. 8–14 and Tables 1 and 2.

Figure 8:
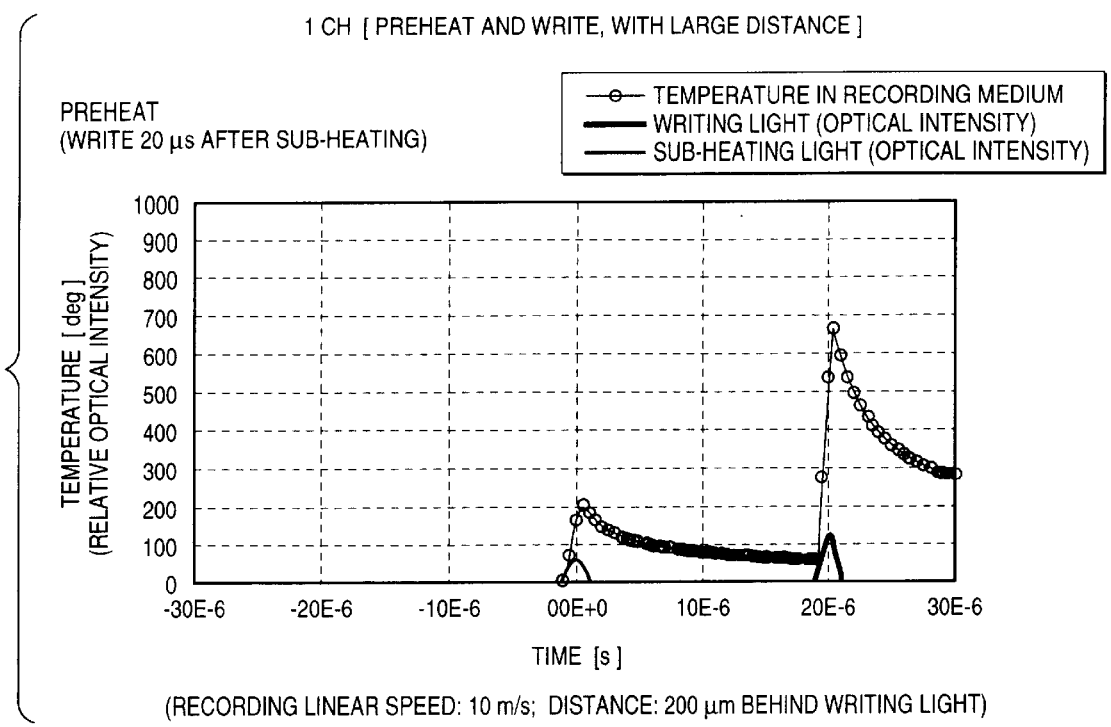
FIG. 8 is a graph showing the correlation between temperature and time of temperature elevation for the case of preheating with a large distance between the writing light and the sub-heating light.
Figure 9:
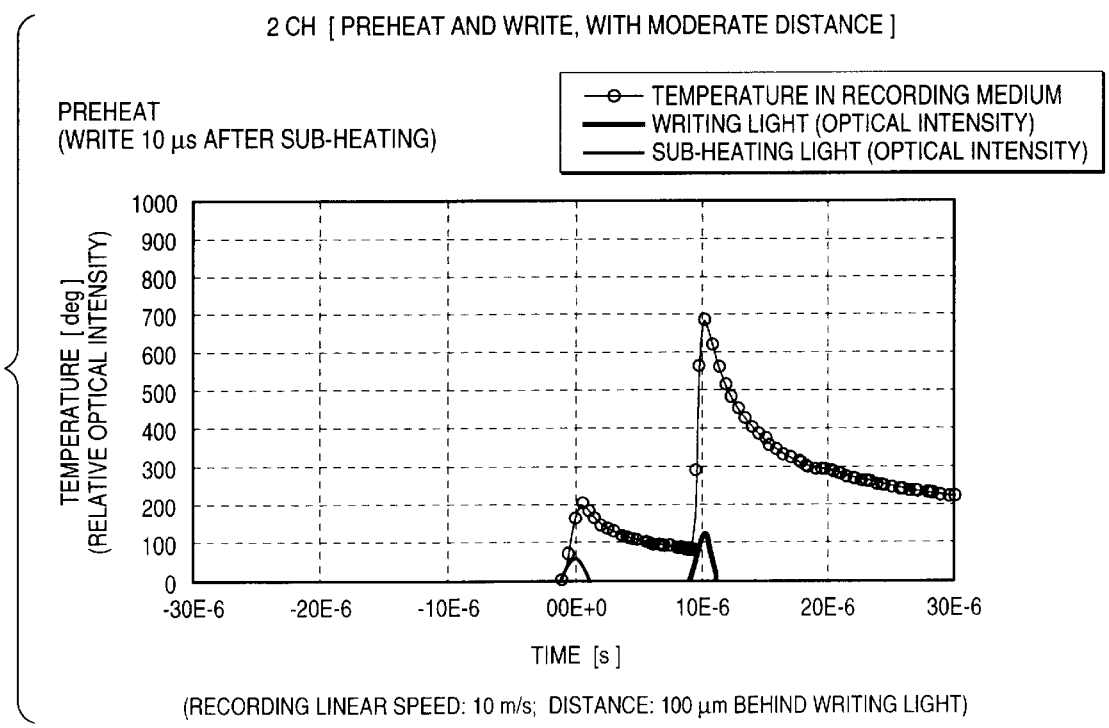
FIG. 9 is a graph of the same nature for the case of preheating with a moderate distance between the writing light and the sub-heating light.
Figure 10:
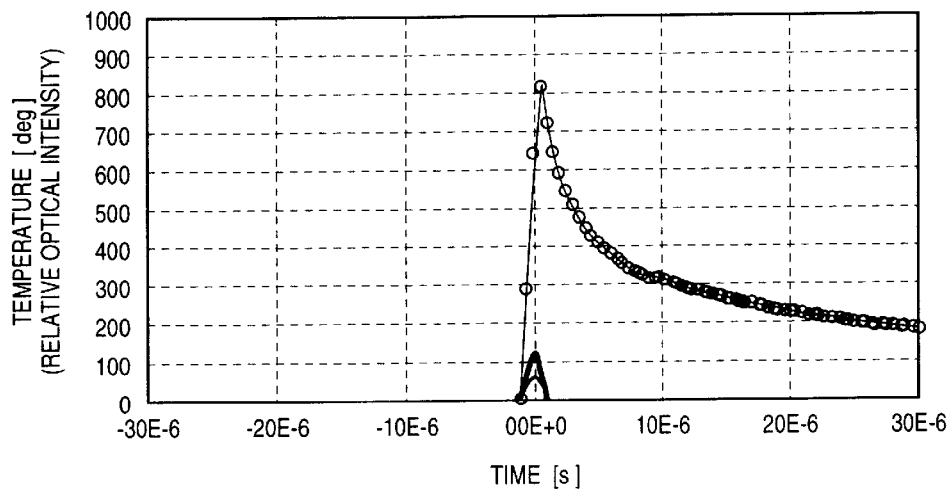
FIG. 10 is a graph of the same nature for the case of simultaneous heating.
Figure 11:
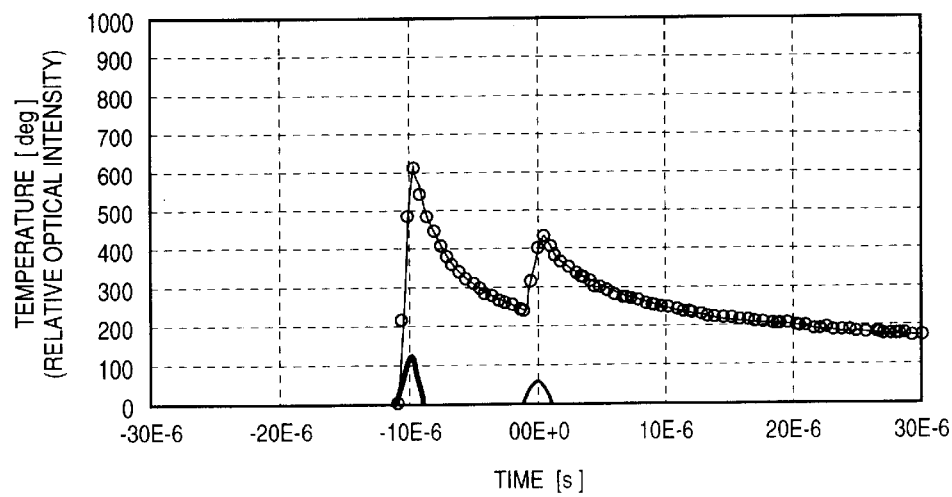
FIG. 11 is a graph of the same nature for the case of post-heating with a moderate distance between the writing light and the sub-heating light.
Figure 12:
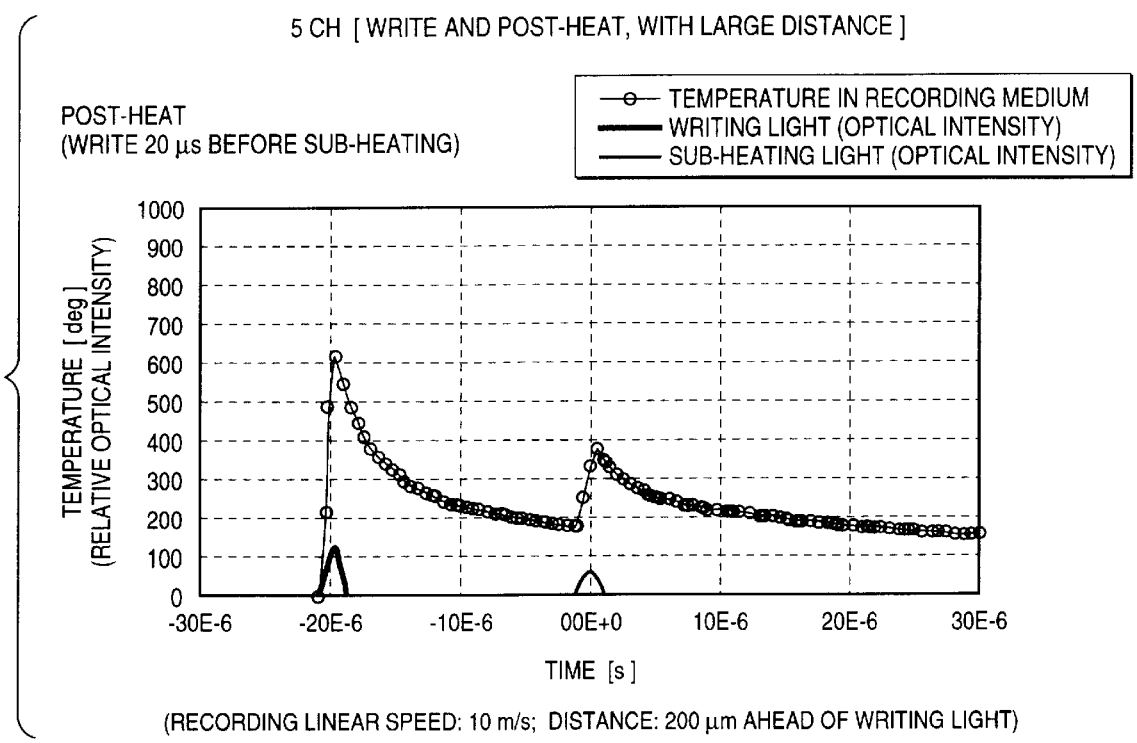
FIG. 12 is a graph of the same nature for the case of post-heating with a large distance between the writing light and sub-heating light.
Figure 13:
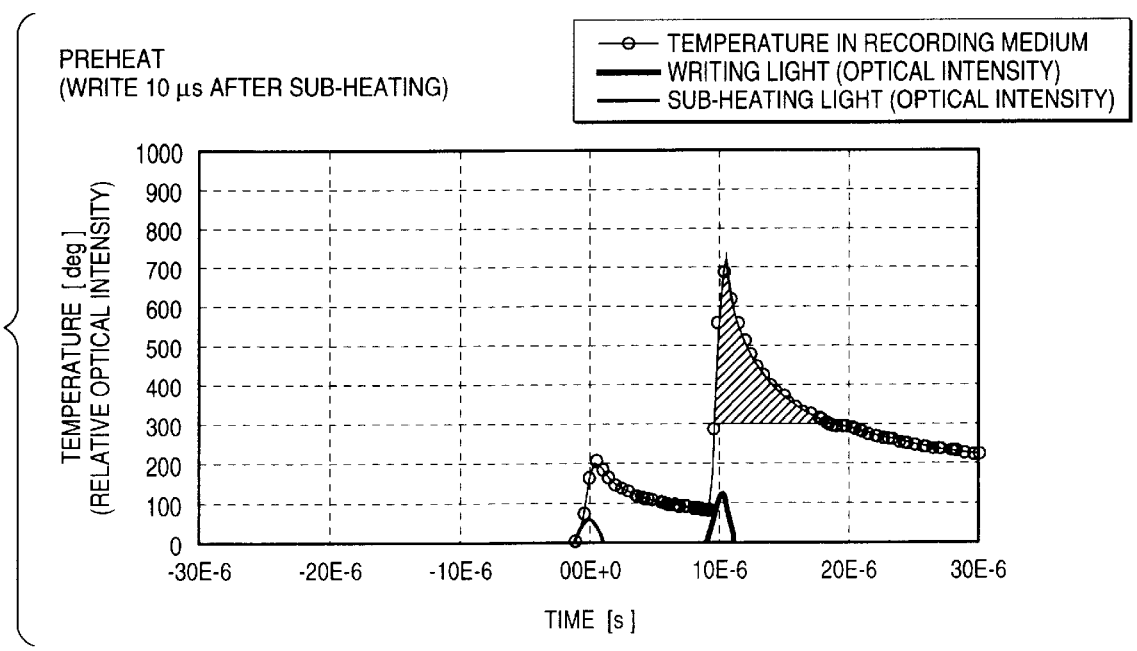
FIG. 13 is a graph of the same nature showing the quantity of heat necessary for recording an image.
Figure 14:
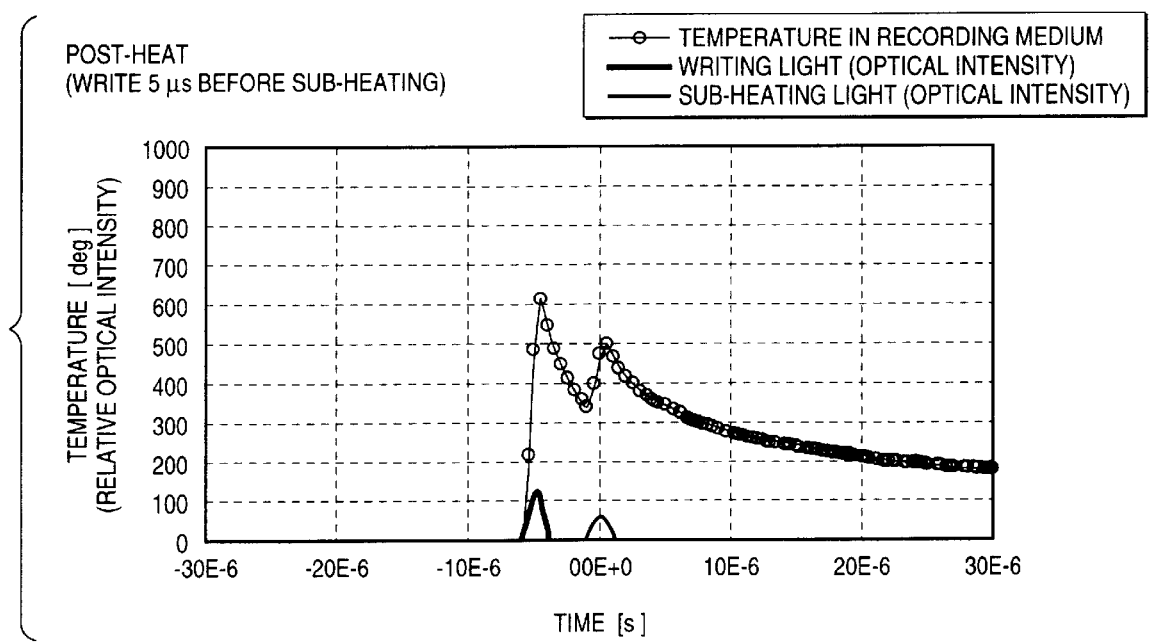
FIG. 14 is a graph of the same nature for the case of post-heating with a suitable distance between the writing light and the sub-heating light.
Figure 15:
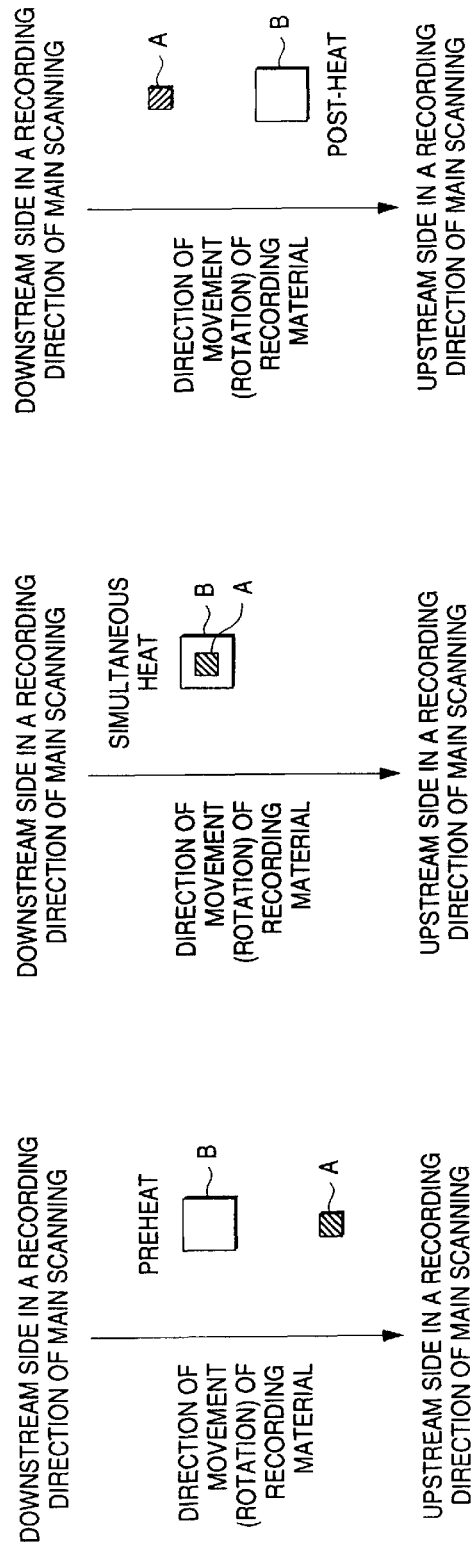
FIGS. 15A–15C show three exemplary positional relationships between the writing light and the sub-heating light as they are applied.
Figure 16:
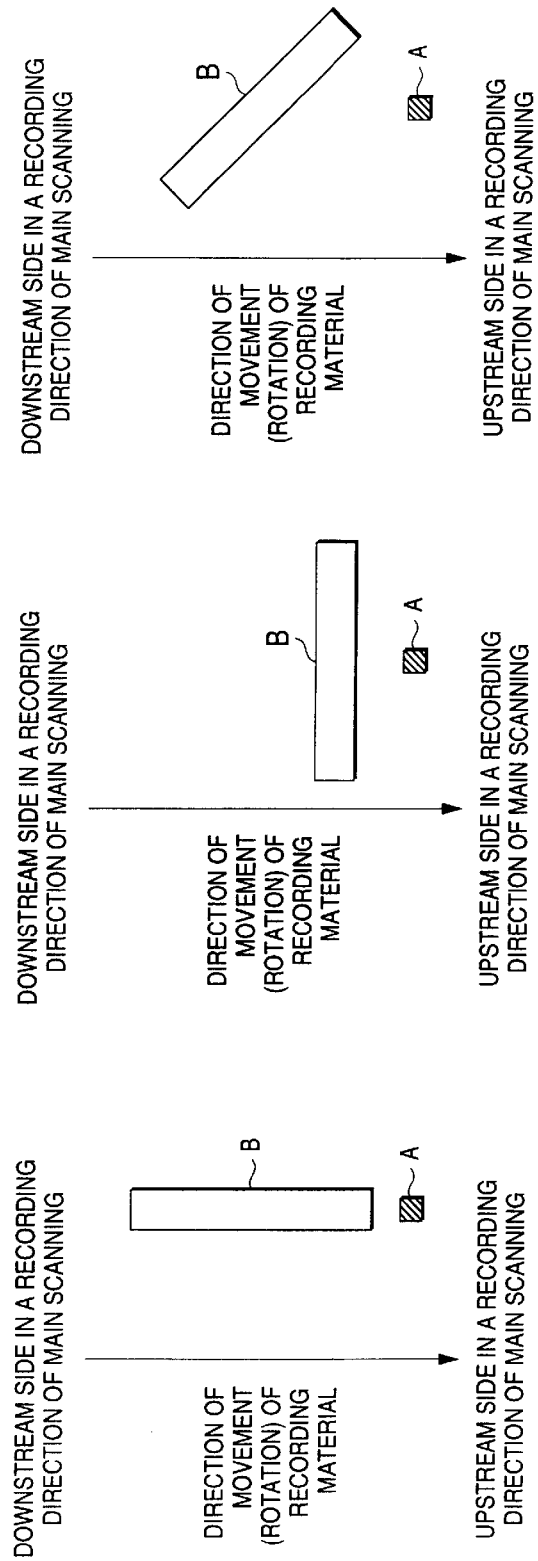
FIGS. 16A–16C show three examples of the sub-heating light as applied in line form.
Figure 17:
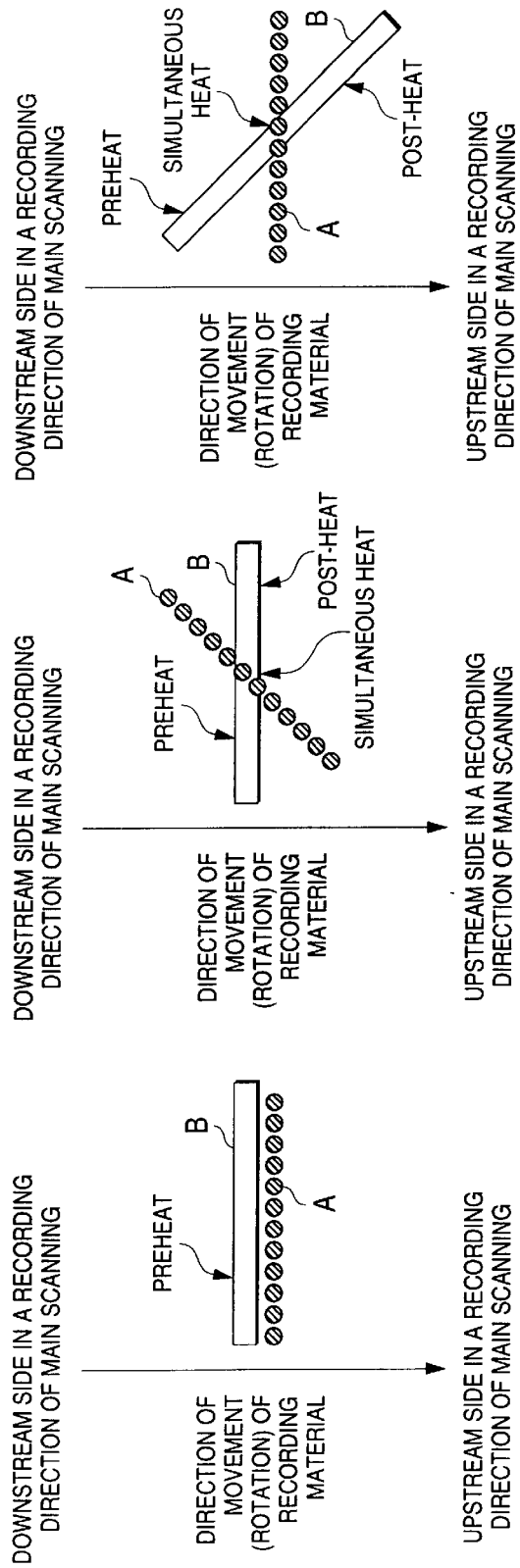
FIGS. 17A–17C show three examples of applying the sub-heating light relative to a one-dimensional array of spots of the writing light.

FIG. 8 is a graph showing the correlation between temperature and time of temperature elevation for the case of preheating with a large distance between the writing light A and the sub-heating light B. FIG. 9 is a graph of the same nature for the case of preheating with a moderate distance between the writing light A and the sub-heating light B. FIG. 10 is a graph of the same nature for the case of simultaneous heating. FIG. 11 is a graph of the same nature for the case of post-heating with a moderate distance between the writing light A and the sub-heating light B. FIG. 12 is a graph of the same nature for the case of post-heating with a large distance between the writing Light A and the sub-heating light B. FIG. 13 is a graph of the same nature showing the quantity of heat necessary for recording an image. FIG. 14 is a graph of the same nature for the case of post-heating with a suitable distance between the writing light A and the sub-heating light B.

Figure 18:
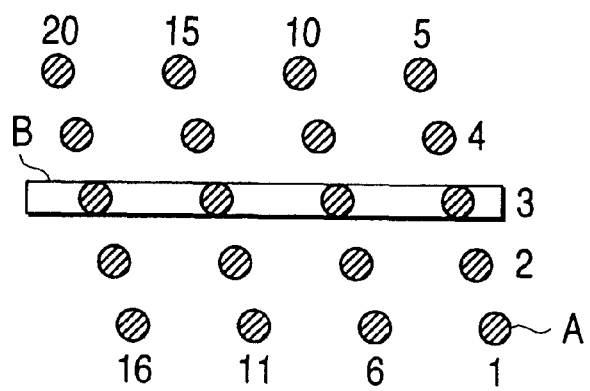
FIG. 18 shows an example of applying the sub-heating light relative to a two-dimensional array of spots of the writing light.

Recording was performed with the spots of the writing light A and the sub-heating light B arranged in the pattern shown in FIG. 18 and the state of the records was evaluated for channels 1–5 that were spaced from the spot of the sub-heating light B by different distances. That is, 1 ch and 2 ch are positioned upstream in a recording direction of main scanning, and 3 ch is positioned at the same point as the spot of the sub-heating light B, and 4 ch and 5 ch are positioned downstream in a recording direction of main scanning.

TABLE 1

| | | Value of the hatched area in FIG. 13 | |
|---|---|---|---|
| | | Area by time higher than 300 deg. [deg · $\mu$s] | State of record |
| 1 ch | Preheat with large distance | 1043 | Δ |
| 2 ch | Preheat with moderate distance | 1178 | ○ |
| 3 ch | Simultaneous heat | 1687 | ○ |
| 4 ch | Post-heat with moderate distance | 1000 | Δ |
| 5 ch | Post-heat with large distance | 782 | X |

As is clear from Table 1, when post-heating was performed with a large distance between the writing light A and the sub-heating light B (the case shown in FIG. 12 for channel 5), the distance between the writing light A and the sub-heating light B was too great to achieve sufficient heating for producing a satisfactory record (X). In the case of post-heating with a moderate distance between the writing light A and the sub-heating light B (see FIG. 11 for channel 4) and preheating with a large distance between the writing light A and the sub-heating light B (see FIG. 8 for channel 1), heating was somewhat insufficient to produce a satisfactory record (Δ); in the case of simultaneous heating (see FIG. 10 for channel 3) and preheating with a moderate distance between the writing light A and the sub-heating light B (see FIG. 9 for channel 2), heating was sufficient to produce a satisfactory record (○)

A medium for recording in a heated mode was used as the colorant sheet in the Example. With this medium, recording was initiated when the product of a temperature exceeding a certain value, say, 300 deg. (see FIG. 13), and a predetermined time exceeding a predetermined value. The product is represented by the hatched area in FIG. 13 and recording is possible when the area exceeds a predetermined value.

Although Table 1 does not show an optimum distance between the writing light A and the sub-heating light B for performing satisfactory post-heating, it can be determined from the condition that the temperature-time product (area) should exceed a predetermined value and as shown in FIG. 14, a preferred distance for post-heating is no more than 50 $\mu$m (5 $\mu$s×10 m/s). The following Table 2 shows this value as in Table 1, which corresponds to the distance between 3.5 channel of the writing light A and the sub-heating light B.

TABLE 2

| | | Area by time higher than 300 deg. [deg · μs] | State of record |
|---|---|---|---|
| 3.5 ch | Post-heat with smaller than the moderate distance | 1324 | ○ |

The foregoing Example shows that satisfactory recording can be performed if the distance between the writing light A and the sub-heating light B in the main scanning direction is set as in the following conditions. First, in a preheating mode where the sub-heating light B is applied prior to the writing light A, it is preferable that the distance is not more than 200 μm, more preferably not more than 100 μm. Second, in a post-heating mode where the sub-heating light B is applied after the writing light A, it is preferable that the distance is not more than 100 μm, more preferably not more than 50 μm. That is, if the distance between the writing light A and the sub-heating light B satisfies the above conditions, the loss of heat due to heat conduction is held below a predetermined value and the heat of the sub-heating light B is effectively contributed to the purpose of heating the recording spots.

It is also clear from the foregoing Examples that satisfactory recording can be accomplished if the time difference between the writing light A and the sub-heating light B is set as in the following conditions. First, in a preheating mode where the sub-heating light B is applied prior to the writing light A, it is preferable that the time difference is not more than 20 μs, more preferably not more than 10 μs. Second, in a post-heating mode where the sub-heating light B is applied after the writing light A, it is preferable that the time difference is not more than 10 μs, more preferably not more than 5 μs. That is, if the time difference between the writing light A and the sub-heating light B satisfies the above conditions, the loss of heat due to heat dissipation from the recording medium is held below a predetermined value and the heat of the sub-heating light B is effectively contributed to the purpose of heating the recording spots.

As described above in detail, the recording apparatus according to the first aspect of the present invention is characterized in that the heating spot from the second emitting portion is applied to the recording medium at equal distances in the main scanning direction from the recording spots applied by the first emitting portion, so the individual recording spots arranged over a wide area are subjected to sub-heating in equal duration to maintain uniform recording characteristics for recording high-quality images in high sensitivity at high speed.

The recording method according to the second aspect of the invention produces records on a recording medium using the recording apparatus which applies a heating spot to the recording medium at equal distances from the recording spots in the main scanning direction; therefore, a plurality of recording spots arranged over a wide area are heated to the same extent so that they have uniform recording characteristics in their wide extending array.

What is claimed is:

1. A recording apparatus for recording on a recording medium in a heated mode, the recording medium being moved along a main scanning direction, said recording apparatus comprising:
    a first emitting portion emitting writing light for providing a plurality of recording spots on the recording medium, the recording spots being inclined at a predetermined angle with respect to the main scanning direction; and
    a second emitting portion emitting sub-heating light for providing a heating light spot on the recording medium, the heating light spot being spaced apart from the recording spots,
    wherein respective distances between (1) the heating light spot and (2) all of the recording spots are substantially constant in the main scanning direction.

2. The recording apparatus according to claim 1, wherein the first emitting portion provides columns of the recording spots, the columns being spaced apart in an auxiliary scanning direction, and
    wherein the second emitting portion provides a corresponding heating light spot for each column of the recording spots.

3. The recording apparatus according to claim 1, wherein the recording medium includes:
    an image-receiving sheet for being wound onto a recording drum of the recording apparatus, said image-receiving sheet including an image-receiving layer; and
    a colorant sheet for being wound onto the image-receiving sheet so that a toner layer of the colorant sheet is superposed on the image-receiving layer of the image-receiving sheet in intimate contact with each other.

4. The recording apparatus according to claim 1, wherein the distance between the heating light spot and each of the recording spots is not more than 200 μm downstream in a recording direction of main scanning in a preheating mode where the sub-heating light is applied prior to the writing light.

5. The recording apparatus according to claim 1, wherein an emitting position of the writing light is coincident with an emitting position of the sub-heating light in the main scanning direction.

6. The recording apparatus according to claim 1, wherein the distance between the heating light spot and each of the recording spots is not more than 100 μm upstream in a recording direction of main scanning in a post-heating mode where the sub-heating light is applied after the writing light.

7. The recording apparatus according to claim 1, wherein a time difference between the writing light and the sub-heating light is not more than 20 μs in a preheating mode where the sub-heating light is applied prior to the writing light.

8. The recording apparatus according to claim 1, wherein a time difference between the writing light and the sub-heating light is not more than 10 μs in a post-heating mode where the sub-heating light is applied after the writing light.

9. A recording method for recording on a recording medium in a heated mode with a recording apparatus, the recording medium being moved along a main scanning direction, said recording method comprising:
    applying a writing light to the recording medium for providing a plurality of recording spots on the recording medium, the recording spots being inclined at a predetermined angle with respect to the main scanning direction; and
    applying a sub-heating light to the recording medium for providing a heating light spot on the recording medium, the heating light spot being spaced apart from the recording spots,
    wherein respective distances between (1) the heating light spot and (2) all of the recording spots are substantially constant in the main scanning direction.

10. The recording method according to claim 9, wherein the recording spots are arranged in columns that are spaced apart in an auxiliary scanning direction, and wherein a corresponding heating light spot is provided for each column of the recording spots.

11. A recording method for recording on a recording medium in a heated mode comprising:

moving the recording medium along a main scanning direction;

applying writing light to the recording medium for providing a plurality of recording spots on the recording medium, the recording spots being arranged in a two-dimensional pattern including columns in the main scanning direction and rows in a direction perpendicular to the main scanning direction, and the recording spots aligned in the columns being inclined at a predetermined angle with respect to the main scanning direction; and applying sub-heating light to the recording medium for providing as many heating spots as the columns of the recording spots on the recording medium, the heating spots being provided in parallel to the columns of the recording spots and inclined at the predetermined angle with respect to the main scanning direction, wherein a distance between each of the columns of the heating spots and each of the recording spots is substantially constant in the main scanning direction.

12. The recording method according to claim 11, further comprising:

winding an image-receiving sheet onto a recording drum of the recording apparatus, the image-receiving sheet including an image-receiving layer; and winding a colorant sheet onto the image-receiving sheet so that a toner layer of the colorant sheet is superposed on the image-receiving layer of the image-receiving sheet in intimate contact with each other.

* * * * *